May 28, 1946. C. R. HAGEN 2,401,152
COTTON CONVEYING APPARATUS FOR COTTON PICKERS
Filed June 29, 1944 3 Sheets-Sheet 3

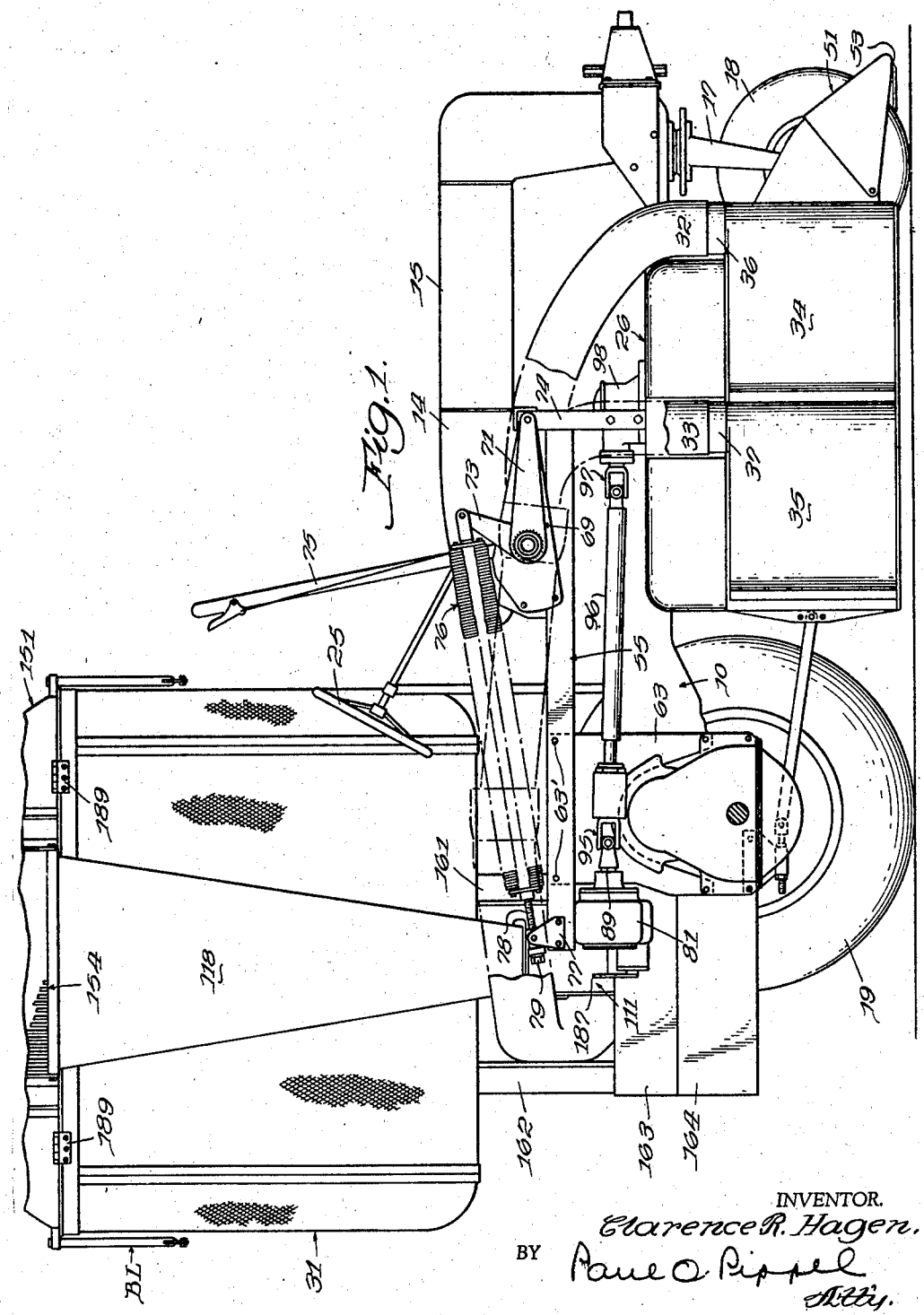

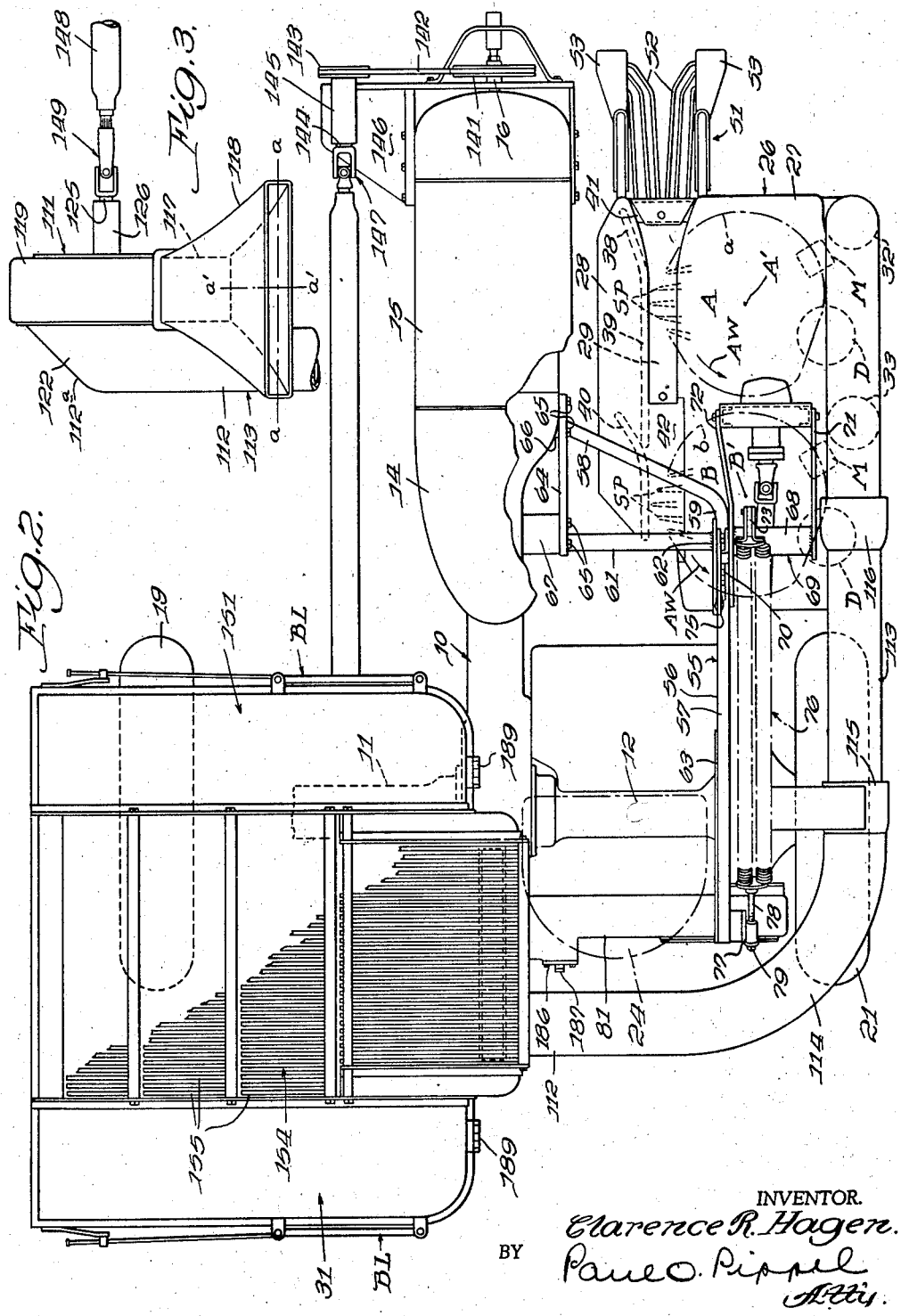

INVENTOR.
Clarence R. Hagen.
BY Paul O. Pippel
Atty.

Patented May 28, 1946

2,401,152

UNITED STATES PATENT OFFICE 2,401,152

COTTON CONVEYING APPARATUS FOR COTTON PICKERS

Clarence R. Hagen, Chicago, Ill., assignor to International Harvester Company, a corporation of New Jersey Application June 29, 1944, Serial No. 542,773

1 Claim. (Cl. 302—17)

This invention relates to cotton picking apparatus and particularly concerns a pneumatic system for conveying cotton from a picking unit to a receptacle which is transported over the cotton field with the picking unit.

An important object of the invention is the provision of a tractor-mounted type of pneumatic cotton conveying system employing a blower on a rearward side portion of a tractor in such an arrangement and position that adapts the rotor of said blower to be driven by a drive shaft receiving power from the front of the tractor engine and extending rearwardly alongside of the tractor to said rotor. The arrangement assures energization of the pneumatic system at all times the engine is running so there is no opportunity for the system to become clogged by cotton initially picked by an engine-driven cotton picking unit.

Another object is the provision of a novel arrangement wherein the blower is beneath a receptacle for the picked cotton whereby the inherent property of the blower to change direction in the course of the cotton can be strategically utilized for directing the cotton upwardly alongside the receptacle into an upper portion thereof.

Another object is the provision of a new blower discharge spout extending upwardly alongside the cotton receptacle and flared to spread the cotton preparatory to impingement thereof in a thin stream onto a ceiling grille in the receptacle to expedite separation of trash from the cotton and the discharge of this trash outwardly of the receptacle through the grille.

The above and other desirable objects inherent in and encompassed by the invention will be better understood upon reading the ensuing description with reference to the annexed drawings, wherein:

Fig. 1 is a side elevational view of a tractor with the preferred embodiment of the invention installed thereon;

Fig. 2 is a plan view of the tractor and apparatus shown in Fig. 1;

Fig. 3 is a plan view of a cotton conveying blower employed in the apparatus and installed below the cotton receptacle as illustrated in Figs. 1, 2, and 4.

Figure 4:
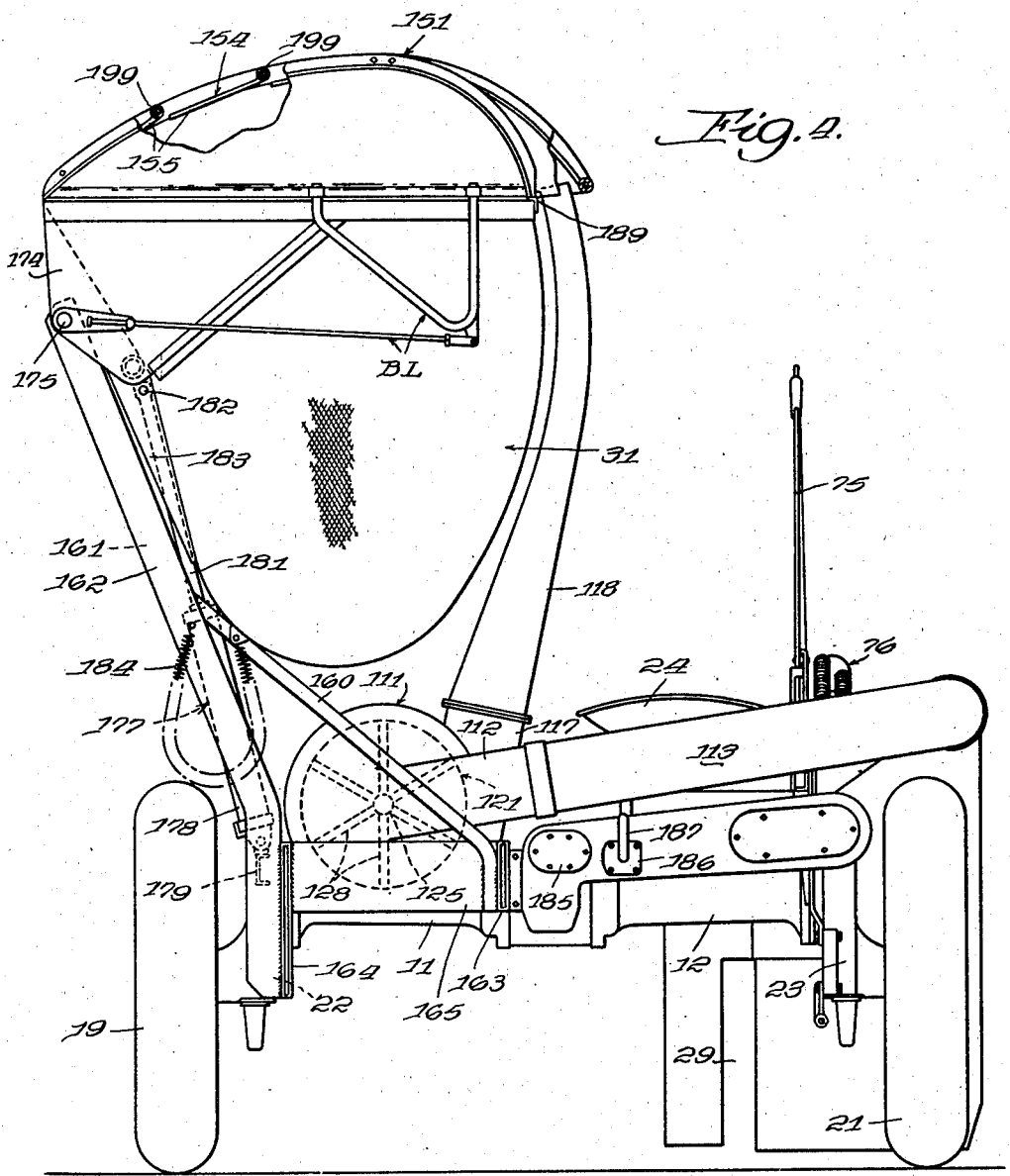
Fig. 4 is a rear elevational view of the tractor and apparatus, with the receptacle in the filling position.

The pneumatic cotton conveying apparatus, constituting the present invention, is illustrated herein in conjunction with collateral apparatus to clarify its function and utility. Such apparatus and the collateral parts are tractor mounted. Claims to said collateral parts will be found in copending applications Serial No. 542,770 to Clarence R. Hagen and Louis E. Nickla, Serial No. 542,771 to Clarence R. Hagen, Serial No. 542,772 to Clarence R. Hagen, and Serial No. 542,774 to Clarence R. Hagen, all assigned to the assignee of the present application.

The tractor upon which the apparatus is herein assembled is one variety of farm tractor comprising a body 10 projecting forwardly from oppositely extending rear axle housings 11 and 12. At the front portion of the body 10 is the conventionally placed internal combustion engine 13 superposed by a fuel tank 14 and a hood 15. A shaft 16 at the front of the tractor is an extension of the engine crank shaft. Support for the front end of the tractor is provided by the usual steering truck 17 comprising a ground-engaging steering wheel 18. Support for the rear end of the tractor is provided by rear traction wheels 19 and 21 at the outer ends of the axle housings 11 and 12. Depending gear containing portions 22 and 23 at the outer ends of the axle housings 11 and 12 contain gears (not shown) which transmit driving force from axles within the housings 11 and 12 to the hubs of the wheels 19 and 21, the housing portions 22 and 23 being upright so as to support the inner parts of the axle housings at an elevation to give ample clearance for the field plants.

An operator's station includes an operator's seat 24 suitably supported adjacently to and over the axle housing 12—that is, to one side of the tractor body 10. The tractor steering wheel 25 is directly in front of the seat 24.

A cotton picking unit generally designated 26 is of the revolvable spindle type. This unit, which is placed at the right of the tractor body, includes a casing 27 separated from a pressure plate assembly 28 by a fore and aft extending plant receiving passage 29. Two groups, A and B, or assemblies of cotton-picking spindles are enclosed in the casing 27 in a tandem arrangement with the assembly A disposed forwardly of the assembly B. Cotton-picking assemblies A and B may be of the character fully described in United States Patent 2,140,631, so it will suffice for the present disclosure merely to explain that the picker spindles SP of the assemblies A and B are revolved generally about axes A' and B' to cause their tips to follow the path indicated by the dot-dash lines a and b. It will be seen, therefore, that the picker spindles, while they are being revolved about the axis A' and B', are successively projected into the plant receiving passage 29 and thereafter withdrawn from this passage. While in the passage and while rotating about their individual axes, these spindles engage and cause the cotton of ripened bolls to be wound thereabout so that upon retraction of the spindles into the casing 27, this cotton will be withdrawn from the bolls. There are several vertically spaced rows of the spindles SP so that the cotton plants disposed within the passage will be operated upon throughout the height of the passage.

The spindles SP revolve in the direction indicated by the arrows AW, and upon arriving in registry with a group of vertically spaced doffing disks shown in dotted outline at D, the cotton is removed from the spindles by these disks and discharged into the casing 27. Subsequently, the spindles come in registry with vertically spaced moistening disks M where they are moistened prior to again being projected into the plant receiving passage. The casing 27, in addition to housing the picking spindle sets, the doffer disks and the moistening disks, also serves as an air chamber of a pneumatic system for the conduction of the picked cotton away from the picker finger assemblies into a cotton receptacle 31. Air is drawn into the casing 27 through the openings at the plant passage where the picking fingers extend outwardly into said passage, and this air laden with the cotton doffed from the spindles, proceeds upwardly through conduit legs 32 and 33 for ultimate delivery into the receptacle 31. Doors 34 and 35 upon the outer side of the casing 27 pivot at their forward ends about axes which are coaxial with the lower ends of the conduit legs 32 and 33, and these doors have short conduit necks 36 and 37 pivotable within the conduit legs to facilitate opening and closing of the doors. Access is thereby easily had to the picker spindles, the doffing apparatus and the spindle moistening apparatus from the outer side of the picking unit 26.

That side of the plant receiving passage 29 opposite to the casing 27 is formed by plant pressing plates 38, 39, and 40 which are yieldably held into the positions illustrated so that they may be displaced toward the tractor engine when pressed upon by a profuse plant growth occupying the passage 29. The pressure plate assembly 28 is supported from the chamber 27 by a horizontal rod 41 at the upper forward end of the passage 29 and by a passage covering plate 42 at the rear end of the passage in registry with the rear picker spindle assembly B.

A plant lifting device 51 is attached to the forward end of the unit 26 for raising the lowermost stems of the plants off of the ground to a sufficient height for passing through the lower ones of the picking spindles SP. The device 51 comprises backwardly inclined rods 52 having ground-engaging runners 53 attached to their front ends.

Support for the picking unit 26 is provided by a frame 55 comprising a generally L-shaped frame member 56 having a fore and aft extending leg 57 and a laterally turned leg 58 having a juncture 59. A strut member 61 projects outwardly in spaced relation with the leg 58 and connects with the frame member 55 adjacently to the juncture 59 where the member 61 extends through an aperture (not shown) in the leg 57 of the frame member 56. A welded connection 62 is provided between the members 61 and 56. The rear part of the leg 57 is supported upon the tractor axle housing 12 by a plate 63 to which the member 57 is secured by any standard means 63' in Fig. 1. A footing plate 64 is welded or otherwise secured to the free ends of the members 58 and 61, and this plate 64 is adapted to be secured to the tractor body 10 by means of cap screws 65 which are screwed into bosses or pads 66 and 67 provided upon said body 10.

The outer end of the strut 61 extending through the frame leg 57 extends into and provides a bearing spindle for the hub 68 of a bell-crank 69, which has a pair of laterally spaced horizontal arms 71 and 72 and an upright arm 73. The forward ends of the arms 71 and 72 mutually support the upper end of a linkage 74 which is suitably attached to the picking unit. By pivoting the bell-crank 69, the outer end of the arms 71 and 72 can be raised or lowered for changing the elevation of the picking unit which is suspended therefrom through the link 74. Pivoting of the bell-crank 69 is effected manually through a lever 75 having its lower end attached to the hub of the bell-crank and operable over a quadrant 70, Fig. 2, for retaining a selected height of the picking unit. The upwardly projecting arm of the bell-crank is operated upon by the counter-balancing spring assembly 76, which is adjustably connected to a bracket 77 on the back end of the frame leg 57 by a threaded rod 78 and a nut 79.

The drive for the picking unit 26, fully disclosed in application Serial No. 542,770, includes chain means within a transverse casing 81 at the rear of the tractor. This chain means is driven by a power take-off shaft (not shown) extending rearwardly through the body 10 of the tractor and drives sprocket means (not shown) within the casing 81 and upon the back end of a shaft 89. Shaft 89 is drivingly connected with gearing within a casing 98 upon the picking unit 26 by a universal joint 95, a drive shaft 96, and a second universal joint 97.

In addition to the air chamber 27 of the picking unit 26 and the conduits 32 and 33 herein above described, the cotton conveying system includes a blower 111 supported upon the tractor beneath the cotton receptacle 31. This blower has a horizontal inlet 112 through which air and cotton are sucked from the picking unit 26 through the conduit legs 32 and 33, Fig. 1, thence through a conduit 113 with which these legs 32 and 33 are confluent, and thence through a curved conduit 114. Conduit 113 extends rearwardly and upwardly over the right rear wheel of the tractor as well as over the rear axle housing structure 12, and the conduit 114 then connecting with the conduit 113 at a flexible joint 115 extends transversely across the rear of the tractor to the horizontal fan inlet 112. The conduit 113 also has a flexible joint 116 which cooperates with the joint 115 in articulating the conduit system so that it facilitates vertical adjustment or movement of the picking unit.

The fan outlet 117, Figs. 3 and 4, extends vertically for connection with an upwardly extending spout 118 through which the air and cotton are discharged into the upper part of the receptacle 31.

Air and cotton enter the main part of the blower casing through a vestibule 122, the main part of the casing comprising a cylindrical wall 119 circumferentially about and radially spaced from a bladed rotor 121. This rotor is fixed for rotation with a shaft 125 rotatable within a bearing 126 carried within the front wall of the blower casing. As seen in Fig. 4, the rotor comprises six impeller blades 128 extending radially from the shaft 125.

In the operation of the blower, the rotating rotor discharges air centrifugally against the cylindrical wall 119, the rotation of the fan being counter-clockwise as viewed from the rear in Fig. 4 so that this discharged air is impelled tangentially upwardly from the casing through the vertical outlet 117. The air thus discharged from the space between the fan blades 128 is replaced by air forced by the atmosphere inwardly through the cotton-picker unit casing 27, where the spindles project into passage 29. The casing 27 therefore serves as an air chamber, and the cotton picked by the spindles and carried into this chamber where it is doffed by the doffing mechanism D is carried upwardly by the air conduit legs 33. The air thus forced into the casing and air chamber 27 of the picking unit, laden with the picked cotton, after passing up into the legs 32 and 33, passes backwardly into the blower inlet. Inlet 112 is arranged transversely of the axis of the rotor 121 whereby the inertia of the cotton has a tendency to cause this cotton to impinge against a deflector wall 112ᵃ and thence to move radially and axially of the rotor, through an opening (not shown) in the rear wall of the main part of the casing, and thence onto the cylindrical wall 119 without engaging or being struck by the fan blades.

Placing the fan or blower 111 below the receptacle 31 has an important advantage of utilizing the fan for changing the direction of flow of the cotton-laden air which has been directed transversely across the rear of the tractor through the conduit 114. Since it is a property of a blower to change the direction of the air propelled thereby, the expedient is here used of taking strategic advantage of the change of flow direction incurred by the blower, so no unnecessary loss in efficiency will obtain in directing the air and cotton to the desired place. Placing the blower 111 immediately below the receptacle 31 has the further advantage of providing for a substantially straight path and a short distance through which the cotton must be moved from the blower into the receptacle, and thereby makes it possible for the cotton and air to be discharged with greater speed through the remaining portion of the conduit system leading to the receptacle. This speed with which the cotton and air are caused to flow upwardly through the spout 118 is significant, since the air and cotton issuing from the upper end of the spout are impinged against the under side of an arched grille 154, which extends across the cover 151 of the receptacle to separate trash from the cotton. This grille 154, which consists of groups of laterally spaced slender elements 155 secured at one end to support members or rods 199 extending across an opening in the cover 151, is fully described in the copending application Serial No. 542,774. It will suffice to say that the cotton, air and debris in striking the under side of the curved grille elements 155 at the right of the hopper cover 151, as viewed in Fig. 4, are separated by the elements 155 which deflect the cotton across the top of the cover while permitting the air and a great portion of the trash to escape between the grille elements. To facilitate separation of the trash from the cotton, the spout 118 is designed with a flare so that the cotton is fed onto the grille in a thin layer. At the lower end of the spout 118 it has a substantially square cross-section. As the spout extends upwardly, it decreases in width perpendicularly to the adjacent wall of the receptacle and increases in width flatwise of this wall and of the grille. At its upper end the spout therefore has a minor axis $a'—a'$ normal to the wall and to the grille, and a major axis $a—a$ extending flatwise to the adjacent wall and grille.

A further advantage of placing the blower beneath the receptacle 31 and particularly at the rear left side of the tractor is that the axis about which the blower rotor rotates extends forwardly alongside the left side of the tractor body and engine. This disposition of the blower rotor axis makes it possible to construct a simple driving connection therefor extending from the front end of the tractor engine crank-shaft. This driving connection consists of a pulley 141, Fig. 2, fixed rotatively to the front end extension 16 of the engine crank-shaft, a belt 142 drivingly connecting the pulley 141 with a pulley 143 upon the front end of a shaft 144 journaled within a bearing 145 supported upon a bracket 146 suitably attached to the tractor engine. A universal joint 147 connects the back end of the shaft 144 with a long shaft 148, of which the back end is connected directly with the blower rotor shaft 125 through a universal joint 149; see Fig. 3. It is essential, to prevent choking of the pneumatic system with cotton, that the blower be operating at the very instant the picking of cotton commences. With the present arrangement for driving the blower at all times while the tractor engine is running, assurance is had that air will be forced from the plant passage 29 in the picking unit 26 into the air chamber or casing 27 at the time of the passage of plants into the passage 29 and the operation thereon by the spindles SP. Introduction of cotton into the chamber 27 without the attendant introduction of air and the consequent choking of the pneumatic system is thereby definitely avoided.

Receptacle 31 is supported upon a standard consisting of upright angle iron pieces 161 and 162 having their lower ends secured to a plate 164, which is detachably connected with the rear axle housing 11 of the tractor. The plate 164, together with a second plate 163 disposed in spaced parallelism therewith and a cross plate 165 welded to the plates 163 and 164, forms a base for the attachment of the receptacle supporting standard. Footing braces 160 are connected between the plate 163 and the standard uprights 161 and 162. Pivotal attachment of the hopper to the standard is effected by plates 174, one being shown in Fig. 4, respectively at the front and the rear ends of the receptacle. These plates are journaled upon opposite end portions of a rod 175 extending between and fixed in the upper ends of the standard members 161 and 162. Pivoting of the receptacle in a counterclockwise direction about the rod 175 from the filling position shown where the upper end of the spout 118 is disposed in discharging relation with the under side of the grille elements 155, to a dumping position, is accomplished by a hydraulic ram 177 having a cylinder 178 of which the lower end is pivotally attached to an angle piece 179 connected between the standard uprights 161 and 162. A piston rod 181 of the hydraulic ram is pivotally connected at 182 to fore and aft spaced plates 183 upon the outer wall of the receptacle. Expansion of the ram by the introduction of fluid into the lower end of the cylinder 178 will cause the piston rod 181 to move upwardly and bring about the aforesaid counter-clockwise pivoting of the receptacle. When the receptacle is rotated approximately 90°, the cover member is caused to pivot about hinges 189 at its inner edge for uncovering the receptacle so that the cotton may be dumped therefrom. Such pivoting of the cover member is accomplished by a bracket and linkage structure generally designated BL of which the operation, not pertinent to the present invention, is described in detail in said copending application Serial No. 542,770. A pair of springs 184, of which one is shown in Fig. 4 and connected between respective of the standard uprights and lower portions of the hopper, become distended when the hopper approaches its dumping position and serve to accelerate the initial return movement of the receptacle toward the filling position subsequent to dumping and when the fluid is allowed to exhaust from the lower end of the ram cylinder 178.

Actuating fluid for the cylinder ram is obtained from a pump 185 and controlled by a valve 186 having a control handle 187 disposed accessibly to an operator at the station 24.

For claims directed to subject-matter herein disclosed but not claimed, reference should be had to copending application of Clarence R. Hagen et al., Serial No. 542,770, containing claims directed to the general arrangement of various components of the apparatus with respect to one another and with respect to the tractor; an application of Clarence R. Hagen, Serial No. 542,771, containing claims directed to features of the picking unit which is suspended at a side of the tractor engine; application of Clarence R. Hagen, Serial No. 542,772, containing claims directed to the blower of the pneumatic cotton conveying system; and application of Clarence R. Hagen et al., Serial No. 542,774, containing claims directed to the cotton receptacle and the grille-cover therefor.

Having thus described the invention with reference to a preferred embodiment thereof with the view of clearly illustrating the invention, I claim:

In a vehicular cotton picking apparatus, a receptacle supporting standard, a cotton-receiving receptacle on said standard, said receptacle including a ceiling grille of laterally spaced longitudinal elements, and a pneumatic cotton conveying system for the introduction of cotton into the receptacle, comprising a blower beneath the receptacle with an outlet for the ejection of cotton-laden air, and a conduit leading upwardly from said outlet adjacently to and exteriorly of said receptacle to discharge the cotton and air against the inner side of the grille, said conduit being compoundly tapered as its upper discharge end is approached to decrease in width along one transverse axis which becomes the minor axis at the discharge end and to increase in width along a transverse axis normal to the first axis and which becomes the major axis at said discharge end, said discharge end of the conduit being arranged with its major axis flatwise transversely of the grille and to discharge angularly against the inner side of the grille lengthwise of its elements, and the taper of said conduit being such that the transverse area at its discharge end does not substantially exceed the transverse area of said conduit.

CLARENCE R. HAGEN.